United States Patent
Lv et al.

(10) Patent No.: US 12,360,040 B2
(45) Date of Patent: Jul. 15, 2025

(54) DETECTION METHOD AND DETECTION DEVICE FOR DETECTING CONCENTRATION OF SOLDER FLUX IN REFLOW OVEN

(71) Applicant: Honor Device Co., Ltd., Shenzhen (CN)

(72) Inventors: Ye Lv, Shenzhen (CN); Xiujuan Yang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/037,125

(22) PCT Filed: Aug. 25, 2022

(86) PCT No.: PCT/CN2022/114774
§ 371 (c)(1),
(2) Date: May 16, 2023

(87) PCT Pub. No.: WO2023/040617
PCT Pub. Date: Mar. 23, 2023

(65) Prior Publication Data
US 2024/0019367 A1 Jan. 18, 2024

(30) Foreign Application Priority Data
Sep. 18, 2021 (CN) .......................... 202111096988.2

(51) Int. Cl.
*G01N 21/55* (2014.01)
*B23K 1/008* (2006.01)
*G01B 11/06* (2006.01)

(52) U.S. Cl.
CPC ............ *G01N 21/55* (2013.01); *B23K 1/008* (2013.01); *G01B 11/06* (2013.01); *G01B 11/0625* (2013.01)

(58) Field of Classification Search
CPC .......... G01N 21/55; B23K 1/008; B23K 1/20; B23K 3/08; G01B 11/06; G01B 11/0625
See application file for complete search history.

(56) References Cited

U.S. PATENT DOCUMENTS

| | | | |
|---|---|---|---|
| 8,499,996 B2 | 8/2013 | Mamber et al. | |
| 2004/0253824 A1 | 12/2004 | Tegeder et al. | |
| 2010/0203307 A1* | 8/2010 | Komiyatani | C09J 163/00 428/220 |
| 2012/0292376 A1 | 11/2012 | Mamber et al. | |
| 2015/0345930 A1 | 12/2015 | Ikeda et al. | |
| 2018/0185967 A1* | 7/2018 | Muraoka | B23K 35/40 |

FOREIGN PATENT DOCUMENTS

| | | |
|---|---|---|
| CN | 102665992 A | 9/2012 |
| CN | 202522500 U | 11/2012 |
| CN | 109900607 A | 6/2019 |

(Continued)

*Primary Examiner* — Jennifer D Bennett
(74) *Attorney, Agent, or Firm* — Slater Matsil, LLP (57) ABSTRACT

A substrate is placed in a reflow oven, where a solder flux volatilized in the reflow oven is capable of adhering to a surface of the substrate to form a solder flux layer, a thickness of the solder flux layer is detected, and a concentration of the solder flux in the reflow oven is calculated based on the thickness of the solder flux layer.

16 Claims, 4 Drawing Sheets

(56) References Cited

FOREIGN PATENT DOCUMENTS

| | | | |
|---|---|---|---|
| CN | 111220242 | A | 6/2020 |
| CN | 111240384 | A | 6/2020 |
| CN | 211374409 | U | 8/2020 |
| CN | 112331271 | A | 2/2021 |
| CN | 213689270 | U | 7/2021 |
| CN | 113547182 | A | 10/2021 |
| JP | H077260 | A | 1/1995 |
| JP | 2011143435 | A | 7/2011 |
| JP | 2018020333 | A * | 2/2018 |
| TW | 200410309 | A | 6/2004 |

* cited by examiner

DETECTION METHOD AND DETECTION DEVICE FOR DETECTING CONCENTRATION OF SOLDER FLUX IN REFLOW OVEN

CROSS-REFERENCE TO RELATED APPLICATIONS

This application is a national stage of International Application No. PCT/CN2022/114774, filed on Aug. 25, 2022, which claims priority to Chinese Patent Application No. 202111096988.2, filed on Sep. 18, 2021. The disclosures of both of the aforementioned applications are hereby incorporated by reference in their entireties.

TECHNICAL FIELD

This application relates to the field of concentration detection technologies, and in particular, to a detection method and detection device for detecting a concentration of a solder flux in a reflow oven.

BACKGROUND

An SMT (Surface Mounted Technology, Surface Mounted Technology) is a mounting technology that is used to directly attach and weld a surface mounted component to a specified position of a substrate without drilling a mounting hole in the substrate. The SMT is widely used for assembling a PCBA (Printed Circuit Board Assembly, Printed Circuit Board Assembly).

Specifically, the component is soldered on a surface of the PCBA by using solder paste. The solder paste is made of a paste-like solder flux and a powder solder into a paste shape, is applied to a soldering portion of the PCBA through printing or by using a disperser, or the like, and is mounted with the component and then heated and melted by a reflow oven, thereby soldering the PCBA and the component.

The solder flux in the solder paste is volatile when being heated and melted. After a period of time, a large amount of solder flux remains on an inner wall and in a pipeline of the reflow oven. As a service time increases, the concentration of the solder flux in the reflow oven increases, and the solder flux volatilized in the reflow oven adheres to the surface of the PCBA when the PCBA passes through the reflow oven. If the concentration of the solder flux in the reflow oven is relatively high, the solder flux adhering to the surface of the PCBA is relatively thick, which affects a sensitive device such as an MIC (Microphone, Microphone) on the PCBA, lowers electrical conductivity of the PCBA, and affects product use reliability and the like.

SUMMARY

Embodiments of this application provide a detection method and detection device for detecting a concentration of a solder flux in a reflow oven, so as to detect a concentration of a solder flux in a reflow oven.

According to a first aspect, an embodiment of this application provides a detection method for detecting a concentration of a solder flux in a reflow oven, including the following steps:
S1: placing a substrate in a reflow oven, where a solder flux volatilized in the reflow oven is capable of adhering to a surface of the substrate to form a solder flux layer;
S2: detecting a thickness of the solder flux layer; and
S3: calculating a concentration of the solder flux in the reflow oven based on the thickness of the solder flux layer.

The substrate is placed in the reflow oven, so that the solder flux in the reflow oven adheres to the surface of the substrate, then the thickness of the solder flux layer is detected, and then the concentration of the solder flux in the reflow oven can be calculated based on the thickness of the solder flux layer. Whether the inside of the reflow oven needs to be cleaned is determined based on the concentration, to prevent product quality from being affected by a relatively high concentration of the solder flux in the reflow oven, so as to ensure the product quality.

Based on the first aspect, an embodiment of this application further provides a first implementation of the first aspect:
Step S3 includes: calculating the concentration of the solder flux in the reflow oven by using the following formula 1 based on the thickness of the solder flux layer:

$$\rho = d/Kt;$$

where $\rho$ is the concentration of the solder flux in the reflow oven, d is the thickness of the solder flux layer, K is a coefficient, and t is a time for which the substrate is placed in the reflow oven.

The concentration of the solder flux in the reflow oven can be calculated by using formula 1 based on the thickness of the solder flux layer and the time for which the substrate is placed in the reflow oven, and whether the inside of the reflow oven needs to be cleaned is determined based on the concentration, to prevent product quality from being affected by a relatively high concentration of the solder flux in the reflow oven, so as to ensure the product quality.

Based on the first aspect or the first implementation of the first aspect, an embodiment of this application further provides a second implementation of the first aspect:
Step S2 specifically includes the following steps:
S21: emitting incident light to the substrate by an incident light source, receiving, by a receiver, first reflected light reflected by a surface of the solder flux layer and second reflected light reflected by a bottom surface of the solder flux layer, and calculating reflectivity of the solder flux layer based on the incident light, the first reflected light, and the second reflected light; and
S22: calculating the thickness of the solder flux layer based on the reflectivity.

The thickness of the solder flux layer is calculated by using the reflectivity of the solder flux layer, so that accuracy of thickness detection of the solder flux layer can be improved.

Based on the second implementation of the first aspect, an embodiment of this application further provides a third implementation of the first aspect:
In step S22, the thickness of the solder flux layer is calculated by using the following formula 2 based on the reflectivity:

$$d = \frac{\lambda}{2\pi n} \cdot \arccos \frac{R-A}{B};$$

where R is the reflectivity of the solder flux layer, A and B are both coefficients, n is a refractive index of the solder flux layer, and $\lambda$ is a wavelength of the incident light.

The thickness of the solder flux layer is calculated based on the reflectivity of the solder flux layer, the refractive index of the solder flux layer, and the wavelength of the incident light, so that accuracy of thickness detection of the solder flux layer can be improved.

Based on the third implementation of the first aspect, an embodiment of this application further provides a fourth implementation of the first aspect:

Before step S1, the detection method further includes step S0: determining the refractive index n of the solder flux layer. In this way, it can be ensured that it is more convenient to perform a thickness detection operation on the solder flux layer at a later stage.

Based on any one of the first aspect or the first implementation to the fourth implementation of the first aspect, an embodiment of this application further provides a fifth implementation of the first aspect:

After step S3, the detection method further includes the following steps:

S4: determining whether the concentration of the solder flux calculated in step S3 is greater than a preset threshold, and performing step S5 if the concentration of the solder flux is greater than the preset threshold; and S5: sending an alarm signal.

Through the setting of the preset threshold, based on the concentration of the solder flux in the reflow oven calculated in step S3, it is determined whether the concentration of the solder flux is greater than the preset threshold. When the concentration of the solder flux is greater than the preset threshold, an alarm signal is sent to remind an operator that the reflow oven needs to be cleaned, to ensure that the reflow oven can be cleaned in a timely manner, so as to ensure the product quality.

Based on the fifth implementation of the first aspect, an embodiment of this application further provides a sixth implementation of the first aspect:

In step S4, step S2 is performed if the concentration of the solder flux is not greater than the preset threshold. With such arrangement, the concentration of the solder flux in the reflow oven can be monitored in real time, to ensure that the reflow oven can be cleaned in a timely manner, so as to prevent the product quality from being affected by a relatively high concentration of the solder flux in the reflow oven.

Based on any one of the first aspect or the first implementation to the sixth implementation of the first aspect, an embodiment of this application further provides a seventh implementation of the first aspect:

Between steps S1 and S2, the detection method further includes step S11: taking the substrate out of the reflow oven. In this way, the detection of the reflectivity of the solder flux layer is performed outside the reflow oven, so that a requirement on performance of a detection subunit for detecting the reflectivity can be lowered, thereby reducing costs.

According to a second aspect, an embodiment of this application provides a detection device for detecting a concentration of a solder flux in a reflow oven, including:

a substrate, where the substrate is placed in a reflow oven, and a solder flux volatilized in the reflow oven is capable of adhering to a surface of the substrate to form a solder flux layer;

a detection unit, configured to detect a thickness of the solder flux layer; and a calculation unit, configured to calculate a concentration of the solder flux in the reflow oven based on the thickness of the solder flux layer.

The substrate is placed in the reflow oven, so that the solder flux in the reflow oven adheres to the surface of the substrate, then the thickness of the solder flux layer is detected, and then the concentration of the solder flux in the reflow oven can be calculated based on the thickness of the solder flux layer. Whether the inside of the reflow oven needs to be cleaned is determined based on the concentration, to prevent product quality from being affected by a relatively high concentration of the solder flux in the reflow oven, so as to ensure the product quality.

Based on the second aspect, an embodiment of this application further provides a first implementation of the second aspect:

The calculation unit calculates the concentration of the solder flux in the reflow oven by using the following formula 1 based on the thickness of the solder flux layer:

$\rho = d/Kt$;

where $\rho$ is the concentration of the solder flux in the reflow oven, d is the thickness of the solder flux layer, K is a coefficient, and t is a time for which the substrate is placed in the reflow oven.

The concentration of the solder flux in the reflow oven can be calculated by using formula 1 based on the thickness of the solder flux layer and the time for which the substrate is placed in the reflow oven, and whether the inside of the reflow oven needs to be cleaned is determined based on the concentration, to prevent product quality from being affected by a relatively high concentration of the solder flux in the reflow oven, so as to ensure the product quality.

Based on the second aspect or the first implementation of the second aspect, an embodiment of this application further provides a second implementation of the second aspect:

The detection unit includes: a detection subunit including an incident light source and a receiver, where the incident light source is configured to emit incident light to the substrate, the receiver is configured to receive first reflected light reflected by a surface of the solder flux layer and second reflected light reflected by a bottom surface of the solder flux layer, and the detection subunit is capable of calculating reflectivity of the solder flux layer based on the incident light, the first reflected light, and the second reflected light; and a calculation subunit, configured to calculate the thickness of the solder flux layer based on the reflectivity.

The thickness of the solder flux layer is calculated by using the reflectivity of the solder flux layer, so that accuracy of thickness detection of the solder flux layer can be improved.

Based on the second implementation of the second aspect, an embodiment of this application further provides a third implementation of the second aspect:

the calculation subunit is configured to calculate the thickness of the solder flux layer by using the following formula 2 based on the reflectivity:

$$d = \frac{\lambda}{2\pi n} \cdot \arccos \frac{R-A}{B};$$

where R is the reflectivity of the solder flux layer, A and B are both coefficients, n is a refractive index of the solder flux layer, and $\lambda$ is a wavelength of the incident light.

The thickness of the solder flux layer is calculated based on the reflectivity of the solder flux layer, the refractive index of the solder flux layer, and the wavelength of the incident light, so that accuracy of thickness detection of the solder flux layer can be improved.

Based on the third implementation of the second aspect, an embodiment of this application further provides a fourth implementation of the second aspect:

The detection device further includes a determining unit, where the determining unit is configured to determine the refractive index n of the solder flux layer. In this way, it can be ensured that it is more convenient to perform a thickness detection operation on the solder flux layer at a later stage.

Based on any one of the second aspect or the first implementation to the fourth implementation of the second aspect, an embodiment of this application further provides a fifth implementation of the second aspect:

The detection device further includes a display unit, where the display unit is capable of displaying the thickness of the solder flux layer and the concentration of the solder flux in the reflow oven. In this way, it is convenient for the operator to observe a detection status in real time.

Based on any one of the second aspect or the first implementation to the fifth implementation of the second aspect, an embodiment of this application further provides a sixth implementation of the second aspect:

The detection device further includes a judging unit and an alarm unit, where the judging unit is configured to determine whether the concentration of the solder flux is greater than a preset threshold, and the alarm unit sends an alarm signal if the judging unit determines that the concentration is greater than the preset threshold. With such arrangement, an alarm signal can be sent when the concentration of the solder flux in the reflow oven is relatively high, to remind the operator to avoid affecting the product quality due to a relatively high solder flux concentration.

Based on any one of the second aspect or the first implementation to the sixth implementation of the second aspect, an embodiment of this application further provides a seventh implementation of the second aspect:

The substrate is a silicon wafer or glass sheet with a smooth surface. This facilitates detection of the reflectivity of the solder flux layer, and costs are low.

BRIEF DESCRIPTION OF THE DRAWINGS

To describe technical solutions in embodiments of this application or in the conventional technology more clearly, the following briefly describes accompanying drawings required for describing embodiments or the conventional technology. Apparently, the accompanying drawings in the following description show some embodiments of the present invention, and a person of ordinary skill in the art may still derive other drawings from these accompanying drawings without creative efforts.

Descriptions of reference numerals in FIG. 1 to FIG. 4 are as follows:

1—Substrate; 2—Detection unit; 3—Calculation unit; 4—Judging unit; 5—Alarm unit; 6—Solder flux layer; 7—Incident light; 81—First reflected light, 82—Second reflected light; and 9—Connecting line.

DETAILED DESCRIPTION OF ILLUSTRATIVE EMBODIMENTS

To enable a person skilled in the art to better understand the technical solutions of the present invention, the following describes the present invention in further details with reference to the accompanying drawings and specific embodiments.

An SMT (Surface Mounted Technology, Surface Mounted Technology) is a mounting technology that is used to directly attach and weld a surface mounted component to a specified position of a substrate without drilling a mounting hole in the substrate. The SMT is widely used for assembling a PCBA (Printed Circuit Board Assembly, Printed Circuit Board Assembly). The component is soldered on a surface of the PCBA by using solder paste. The solder paste is made of a paste-like solder flux and a powder solder into a paste shape, is applied to a soldering portion of the PCBA through printing or by using a disperser, or the like, and is mounted with the component and then heated and melted by a reflow oven, thereby soldering the PCBA and the component.

Electronic products basically use lead-free solder paste. Because fluidity, solderability, and wettability of the lead-free solder paste are lower than those of lead-free solder paste, to improve soldering quality of the lead-free solder paste, more solder flux is usually added to the solder paste to overcome the disadvantage of low fluidity of the lead-free solder paste. When the reflow oven heats and melts the solder paste, the solder flux is volatilized in the reflow oven. After a period of time, a large amount of solder flux remains on an inner wall and in a pipeline of the reflow oven. As a service time increases, the concentration of the solder flux in the reflow oven increases. In this case, a solder flux layer with a certain thickness easily adheres to the surface of the PCBA when the PCBA passes through the reflow oven, which affects a sensitive device on the PCBA, lowers electrical conductivity of the PCBA, or even affects product use reliability and the like. Therefore, embodiments of the present invention provide a detection method and detection device for detecting a concentration of a solder flux in a reflow oven, which can detect the concentration of the solder flux in the reflow oven, so that when the concentration of the solder flux in the reflow oven is relatively high, it is convenient to find and clean up the solder flux in a timely manner, so as to ensure the product quality.

Figure 1:
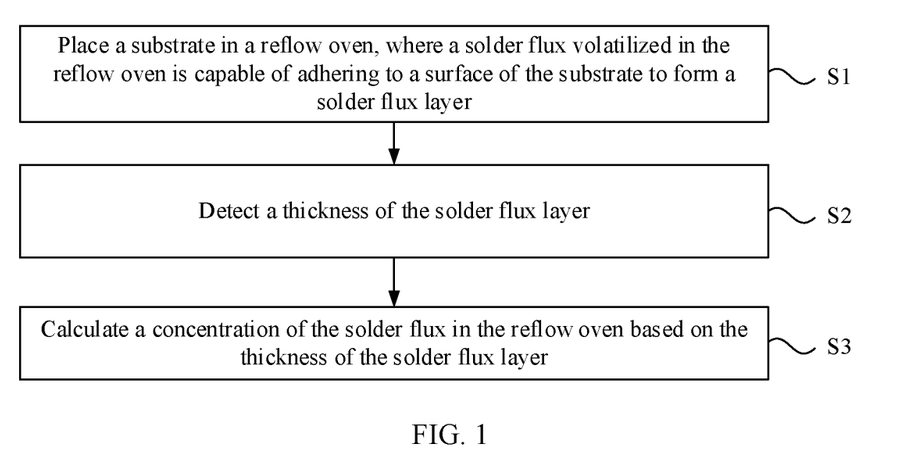
FIG. 1 is a block flow diagram of a detection method for detecting a concentration of a solder flux in a reflow oven.

As shown in FIG. 1, a detection method for detecting a concentration of a solder flux in a reflow oven according to an embodiment of the present invention includes the following steps.

S1: Place a substrate 1 in a reflow oven, where a solder flux volatilized in the reflow oven is capable of adhering to a surface of the substrate 1 to form a solder flux layer 6.

S2: Detect a thickness of the solder flux layer 6.

S3: Calculate a concentration of the solder flux in the reflow oven based on the thickness of the solder flux layer 6.

Specifically, the reflow oven has the solder flux that has a certain concentration and that is in a volatile state. In step S1, the substrate 1 is placed in the reflow oven, and after a time t, the solder flux volatilized in the reflow oven adheres to the surface of the substrate 1, to form a solder flux layer 6 with a certain thickness on the surface of the substrate 1; then in step 2, the thickness of the solder flux layer 6 is detected to obtain a thickness d of the solder flux layer 6; and in step S3, the thickness d of the solder flux layer 6 detected in step 2 is substituted into the following formula 1, so that the concentration of the solder flux in the reflow oven can be calculated:

$$\rho = \frac{d}{Kt};$$

where ρ is the concentration of the solder flux in the reflow oven, d is the thickness of the solder flux layer 6, K is a coefficient, and t is a time for which the substrate 1 is placed in the reflow oven, that is, a time for the solder flux layer 6 to be formed on the surface of the substrate 1.

It is not difficult to understand that a higher concentration p of the solder flux in the reflow oven and a longer time t for which the substrate 1 is placed in the reflow oven indicate a larger thickness d of the solder flux layer 6 adhering to the surface of the substrate 1. Under the condition of the same time t, the thickness d of the solder flux layer 6 is proportional to the concentration p of the solder flux in the reflow oven, and the three parameters meet the relationship in the foregoing formula 1. Therefore, when the time t for which the substrate 1 is placed in the reflow oven is known and the thickness d of the solder flux layer 6 is known, the concentration of the solder flux in the reflow oven can be calculated by using formula 1. If the concentration p of the solder flux is excessively large, the inside of the reflow oven may be cleaned in a timely manner to reduce the concentration of the solder flux in the reflow oven. In this way, the following case is prevented when the PCBA passes through the reflow oven: A relatively thick solder flux film adheres to the surface of the PCBA because of an excessively high concentration of the solder flux, which affects a sensitive device such as an MIC on the PCBA, reduces electrical conductivity of the PCBA, and affects product use reliability and the like. Therefore, the product quality is ensured.

In this embodiment, the concentration of the solder flux in the reflow oven is detected, and whether the reflow oven needs to be cleaned is determined based on a detection result, to ensure product quality. This saves time and ensures high efficiency compared with a solution in which the product quality is ensured by increasing a frequency of cleaning the reflow oven without detecting the concentration of the solder flux.

In step S2, there is no limitation on a specific method for detecting the thickness of the solder flux layer 6 formed through adhering to the surface of the substrate 1, for example, the thickness of the solder flux layer 6 can be directly measured by a film thickness meter, an ellipsometer, a step profiler or an FIB (Focused Ion beam, Focused Ion beam).

Because the solder flux layer 6 is relatively thin and relatively soft, it is difficult to ensure detection precision by directly measuring its thickness. However, if the thickness is measured by the FIB, although a detection result is relatively precise, an operation is relatively complicated and costs are relatively high. Therefore, in this embodiment, detecting reflectivity of the solder flux layer 6 and then calculating the thickness of the solder flux layer 6 based on the reflectivity and formula 2 can ensure accuracy of the detection result, and can further simply the operation and reduce detection costs.

Specifically, in step S2, the detecting a thickness of the solder flux layer 6 specifically includes the following steps.

S21: Emit incident light to the substrate by an incident light source, receive, by a receiver, first reflected light reflected by a surface of the solder flux layer and second reflected light reflected by a bottom surface of the solder flux layer, and calculate reflectivity of the solder flux layer based on the incident light, the first reflected light, and the second reflected light.

Figure 4:
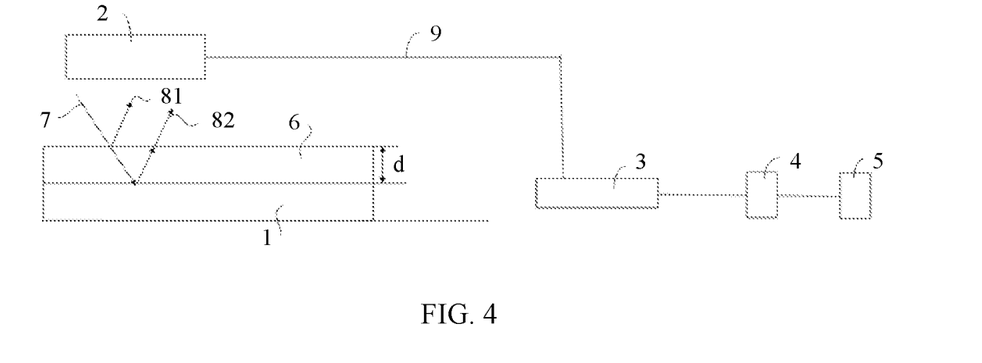
FIG. 4 is a schematic diagram of a structure of a detection device for detecting a concentration of a solder flux in a reflow oven in a detection status.

As shown in FIG. 4, an incident light source can emit incident light 7 to a substrate 1, and a receiver can receive reflected light reflected by a surface and a bottom surface of a solder flux layer 6. Specifically, the reflected light reflected by the surface of the solder flux layer 6 is first reflected light 81, and the reflected light reflected by the bottom surface of the solder flux layer 6 is second reflected light 82. The receiver can receive the first reflected light 81 and the second reflected light 82, and then the reflectivity of the solder flux layer 6 is calculated based on the incident light 7, the first reflected light 81, and the second reflected light 82.

Specifically, how to calculate reflectivity R of the solder flux layer 6 based on the incident light 7, the first reflected light 81, and the second reflected light 82 is a well-known existing technology for a person skilled in the art. For brevity, details are not described herein again. In this embodiment, the reflectivity of the solder flux layer 6 may be detected by an ellipsometer, a film thickness meter, or the like. This is not specifically limited herein.

S22: Calculate the thickness of the solder flux layer 6 based on the reflectivity.

Specifically, the thickness of the solder flux layer 6 is calculated by using the following formula 2 based on the reflectivity:

$$d = \frac{\lambda}{2\pi n} \cdot \arccos\frac{R-A}{B};$$

where R is the reflectivity of the solder flux layer 6, A and B are both coefficients, n is a refractive index of the solder flux layer 6, and λ is a wavelength of the incident light 7.

In an initial state, if the refractive index n of the solder flux layer 6 is known, the refractive index n can be directly used; or if the refractive index n of the solder flux layer 6 is unknown, the refractive index n may be first determined, and then the refractive index n is used as a constant. Therefore, before step S1, the detection method further includes step S0: determining the refractive index n of the solder flux layer 6.

Specifically, a test substrate is placed in a reflow oven, a solder flux film can be formed through adhering to a surface of the test substrate, and then the test substrate is taken out; a thickness d' of the solder flux film is detected by using an FIB (Focused Ion beam, Focused Ion beam), and incident light 7 is emitted to a surface of the solder flux film by an incident light source (such as a tungsten-halogen lamp or a tritium lamp); the incident light 7 has a known wavelength λ and meets 220 nm≤λ≤1700 nm; then reflectivity R' of the solder flux film is detected, d=d' and R=R' are substituted into the foregoing formula 2. Because λ, A, and B are all known, the refractive index n can be obtained.

That is, before use, the refractive index n needs to be determined, and then during later thickness detection, the refractive index n may be directly used as a constant. In each detection, the thickness of the solder flux layer 6 can be calculated only by detecting the reflectivity of the solder flux layer 6, which is convenient to operate and can further ensure accuracy of a thickness detection result.

That is, before detection, the thickness of the solder flux film is first tested by using the FIB, the reflectivity of the solder flux film is detected, the value of the refractive index n is determined by using formula 2, and then the value of the refractive index n may be used as a fixed value. When the thickness of the solder flux layer 6 is detected at a later stage, it is not required to use the FIB for detection, and the thickness can be calculated only by detecting the reflectivity of the solder flux layer 6, which ensures accuracy of the detection result, and is convenient to operate and require low costs.

In this embodiment, the reflecting substrate 1 with high temperature resistance and a smooth surface is placed in the reflow oven. The solder flux in the reflow oven can adhere to the surface of the substrate 1, and the formed solder flux layer 6 has a uniform thickness. The substrate 1 may be a silicon wafer, a glass sheet, or the like, and requires relatively low costs. In addition, the substrate 1 further has a function of reflecting light, to facilitate detection of the reflectivity of the solder flux layer 6. A quantity of specific detection points is not limited. There may be one point or a plurality of points, and thickness detection values of the plurality of detection points are averaged.

Figure 2:
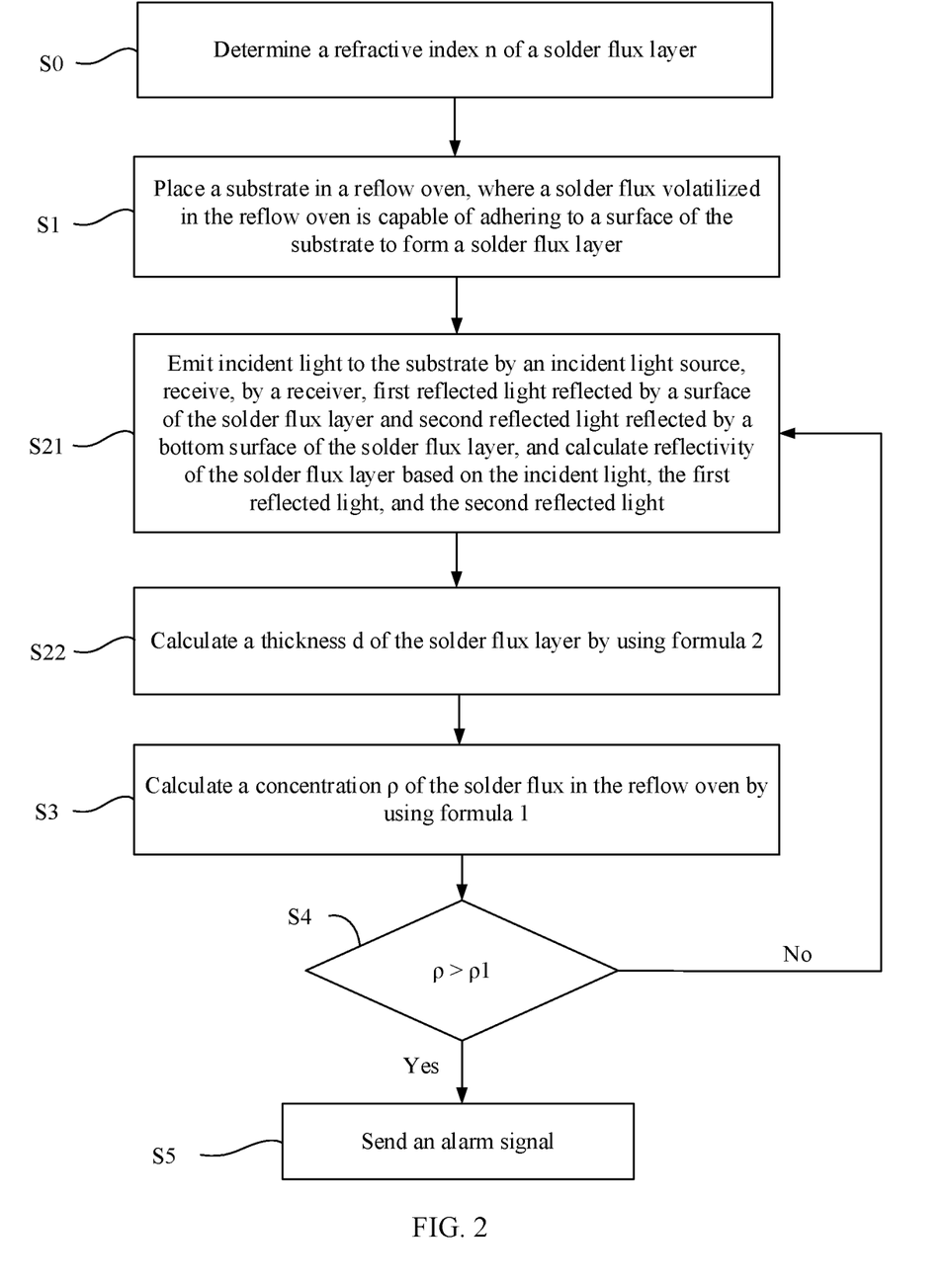
FIG. 2 is a detailed block flow diagram of a detection method for detecting a concentration of a solder flux in a reflow oven.
Figure 3:
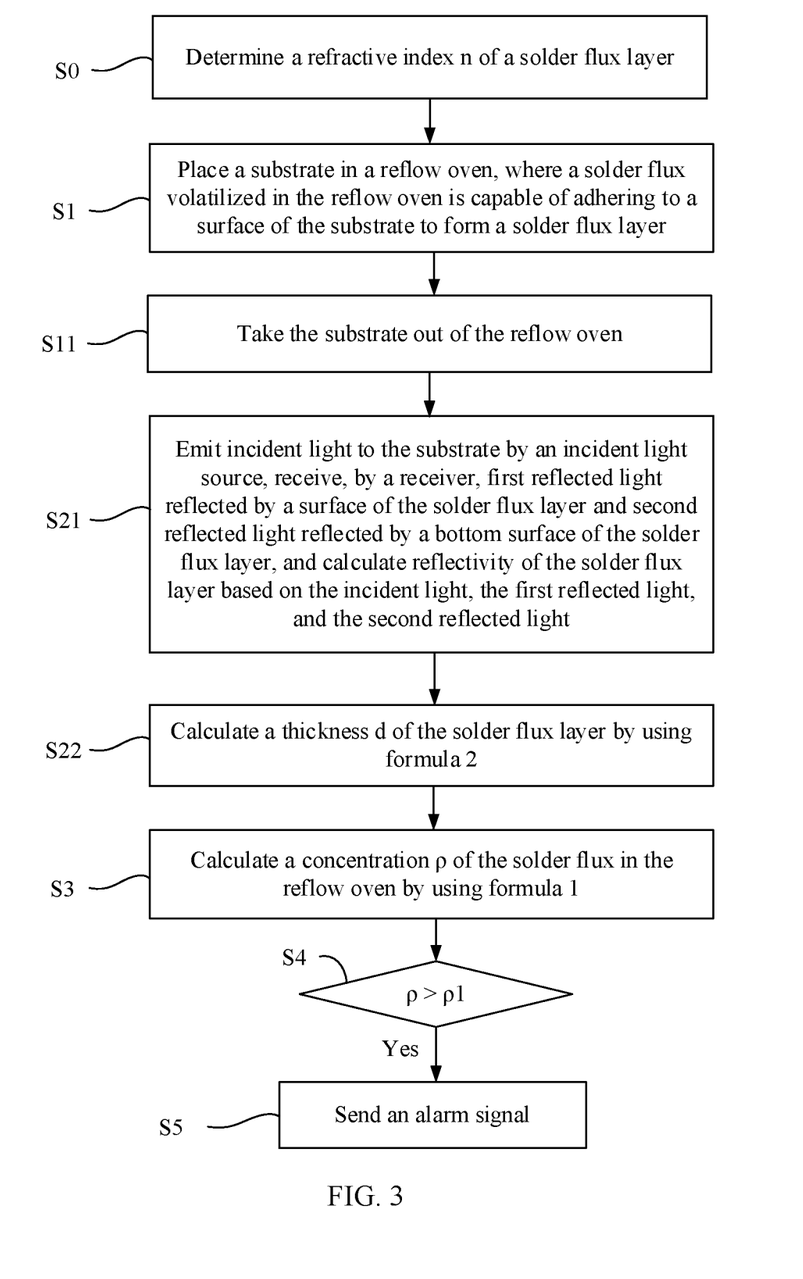
FIG. 3 is a detailed block flow diagram of a detection method for detecting a concentration of a solder flux in a reflow oven.

As shown in FIG. 2 and FIG. 3, in this embodiment, after the concentration of the solder flux is calculated by using formula 1 in step S3, the detection method further includes the following steps.

S4: Determine whether the concentration of the solder flux calculated in step S3 is greater than a preset threshold, and performing step S5 if the concentration of the solder flux is greater than the preset threshold; and S5: Send an alarm signal.

In step S3, the concentration p of the solder flux in the reflow oven is calculated by using formula 1. In step S4, it is determined whether the concentration p of the solder flux is greater than a preset threshold ρ1. If ρ>ρ1, it indicates that the concentration p of the solder flux in the reflow oven is excessively high; and after a PABC passes through the reflow oven, the solder flux layer 6 adhering to the surface of the PABC may affect a sensitive device on the PABC, electrical conductivity of the PABC, and the like. Therefore, through the setting of the preset threshold ρ1, if ρ>ρ1, an alarm signal is sent to remind an operator that the reflow oven needs to be cleaned. It is not difficult to understand that in step S4, if ρ≤ρ1, it indicates that the concentration ρ of the solder flux in the reflow oven is relatively low; and after the PABC passes through the reflow oven, the solder flux does not affect the sensitive device on the PABC, the electrical conductivity of the PABC, and the like, so that welding quality of the PCBA can be ensured, there is no need to clean the reflow oven, and therefore there is no need to send an alarm signal.

Further, as shown in FIG. 2, in step S4, if ρ≤ρ1, step S2 is performed, that is, the concentration ρ of the solder flux in the reflow oven is monitored in real time. If ρ>ρ1, the reflux oven is cleaned; or if ρ≤ρ1, monitoring is continued. In this way, it can be further ensured that when the concentration ρ of the solder flux in the reflow oven reaches the preset threshold ρ1, the reflow oven is cleaned in a timely manner, to prevent product quality from being affected by a relatively high concentration ρ of the solder flux in the reflow oven, so as to ensure the product quality.

The concentration of the solder flux is monitored in real time. During the monitoring, the substrate 1 is always located in the reflow oven, and a detection subunit configured to detect the reflectivity of the solder flux layer 6 is also arranged in the reflow oven. In this case, the detection subunit has high temperature resistance.

Specifically, in this embodiment, a specific value of the preset threshold is not limited and may be specifically set based on an actual situation, provided that it is ensured that when the concentration of the solder flux in the reflow oven is not greater than the preset threshold, after the PABC passes through the reflow oven, the solder flux does not affect the sensitive device on the PABC, the electrical conductivity of the PABC, and the like.

Certainly, in this embodiment, the detection method may not include step S4 and step S5, and the operator may choose whether to clean the reflow oven based on a situation and by observing the detected concentration of the solder flux. An alarm signal can be sent in step S5 when the concentration of the solder flux in the reflow oven exceeds the preset threshold in step S4. The alarm signal may be any one or a combination of more of a text signal, an acoustic signal, and a photoelectric signal. This is not specifically limited. The alarm signal can remind the operator, thereby reducing a manual operation intensity, preventing a situation that the concentration of the solder flux in the reflow oven is excessively high due to manual misoperation and the solder flux is not cleaned up in a timely manner, and ensuring reliability of a product passing through the reflow oven.

As shown in FIG. 3, between step S1 and step S2, the detection method further includes step S11: Take the substrate 1 out of the reflow oven. Specifically, in step S1, the substrate 1 is placed in the reflow oven. After a certain period of time, the solder flux layer 6 with a certain thickness adheres to the surface of the substrate 1, and then in step S11, the substrate 1 is taken out of the reflow oven. Then step S2 is performed outside the reflow oven to detect the thickness of the solder flux layer 6 adhering to the surface of the substrate 1. That is, when the thickness of the solder flux layer 6 is detected, the substrate 1 is located outside the reflow oven, thereby facilitating the detection of the thickness or reflectivity of the solder flux layer 6. In addition, because the temperature inside the reflow oven is relatively high, the detection of the thickness of the solder flux layer 6 outside the reflow oven can lower a requirement for performance of a related detection component used for detecting the thickness or the reflectivity, thereby reducing costs.

Specifically, in step S2, when the reflectivity of the solder flux layer 6 is detected, the substrate 1 is located outside the reflow oven, but its specific placement position is not limited. That is, in step S11, after being taken out, the substrate 1 may be placed at a specific detection position based on an actual situation.

The solution of taking the substrate 1 out of the reflow oven for thickness detection is suitable for periodic detection or detection performed through observation as required. Certainly, the substrate 1 and the detection subunit may alternatively be located in the reflow oven if the detection is performed periodically or as required.

An embodiment of the present invention provides a detection device for detecting a concentration of a solder flux in a reflow oven. As shown in FIG. 4, the detection device specifically includes a substrate 1, a detection unit 2, and a calculation unit 3. After the substrate 1 is placed in a reflow oven, a solder flux volatilized in the reflow oven can adhere to a surface of the substrate 1 to form a solder flux layer 6 with a certain thickness. The detection unit 2 is configured to detect the thickness of the solder flux layer 6 adhering to the surface of the substrate 1. The calculation unit 3 is configured to calculate a concentration of the solder flux in the reflow oven based on the thickness of the solder flux layer 6.

Specifically, the calculation unit 3 calculates the concentration of the solder flux in the reflow oven by using the following formula 1 based on the thickness of the solder flux layer 6 detected by the detection unit 2:

$$\rho = \frac{d}{Kt};$$

where ρ is the concentration of the solder flux in the reflow oven, d is the thickness of the solder flux layer 6, K is a coefficient, and t is a time for which the substrate 1 is placed in the reflow oven, that is, a time for the solder flux layer 6 to be formed on the surface of the substrate 1.

Specifically, in this embodiment, for the detection method for detecting a concentration of a solder flux in a reflow oven, and a principle and technical effects thereof, refer to the related description in the foregoing embodiment of the detection method for detecting a concentration of a solder flux in a reflow oven. For brevity, details are not described herein again.

The detection unit 2 is configured to detect the thickness of the solder flux layer 6. A specific method for detecting the thickness of the solder flux layer 6 formed through adhering to the surface of the substrate 1 is not limited. For example, the detection unit 2 may be provided as any one of a film thickness meter, an ellipsometer, a step profiler or an FIB, and the thickness of the solder flux layer 6 is directly measured.

Because the solder flux layer 6 is relatively thin and relatively soft, it is difficult to ensure detection precision by directly measuring its thickness. However, if the thickness is measured by the FIB, although a detection result is relatively precise, an operation is relatively complicated and costs are relatively high. Therefore, in this embodiment, detecting reflectivity of the solder flux layer 6 and then calculating the thickness of the solder flux layer 6 based on the reflectivity and formula 2 can ensure accuracy of the detection result, and can further simply the operation and reduce detection costs.

Specifically, the detection unit 2 includes a detection subunit and a calculation subunit, where the detection subunit is configured to detect the reflectivity of the solder flux layer 6, and the calculation subunit is configured to calculate the thickness of the solder flux layer 6 based on the reflectivity.

Specifically, the detection subunit includes an incident light source and a receiver, where the incident light source can emit incident light 7 to a substrate 1, and the receiver can receive reflected light reflected by a surface and a bottom surface of a solder flux layer 6 respectively. Specifically, the reflected light reflected by the surface of the solder flux layer 6 is first reflected light 81, and the reflected light reflected by the bottom surface of the solder flux layer 6 is second reflected light 82. The receiver can receive the first reflected light 8i and the second reflected light 82, and the detection subunit can calculate the reflectivity of the solder flux layer 6 based on the incident light 7, the first reflected light 8i, and the second reflected light 82. Then the calculation subunit calculates the thickness of the solder flux layer 6 by using formula 2.

Specifically, how to calculate reflectivity R of the solder flux layer 6 based on the incident light 7, the first reflected light 8i, and the second reflected light 82 is a well-known existing technology for a person skilled in the art. For brevity, details are not described herein again. In this embodiment, the reflectivity of the solder flux layer 6 may be detected by an ellipsometer, a film thickness meter, or the like. This is not specifically limited herein.

The calculation subunit is configured to calculate the thickness of the solder flux layer 6 by using the following formula 2 based on the reflectivity:

$$d = \frac{\lambda}{2\pi n} \cdot \arccos\frac{R-A}{B};$$

where R is the reflectivity of the solder flux layer 6, A and B are both coefficients, n is a refractive index of the solder flux layer 6, λ is a wavelength of the incident light 7, and the incident light 7 is used to detect the reflectivity of the solder flux layer 6.

In this embodiment, the calculation subunit and the calculation unit 3 may be integrated into one unit, or may be two mutually independent units. This is not specifically limited herein.

In an initial state, if the refractive index n of the solder flux layer 6 is known, the refractive index n can be directly used; or if the refractive index n is unknown, the refractive index n is first determined before use. The detection device further includes a determining unit, where the determining unit is configured to determine the refractive index n of the solder flux layer 6. Specifically, for how to determine the refractive index n, refer to the related description in the foregoing embodiment of the detection method for detecting a concentration of a solder flux in a reflow oven. For brevity, details are not described herein again.

Before detection, the thickness of the solder flux film is first tested by using the FIB, the reflectivity of the solder flux film is detected, the value of the refractive index n is determined by using formula 2, and then the value of the refractive index n may be used as a fixed value. When the thickness of the solder flux layer 6 is detected at a later stage, it is not required to use the FIB for detection, and the thickness can be calculated only by detecting the reflectivity of the solder flux layer 6, which is convenient to operate and require low costs.

In this embodiment, the substrate 1 has a smooth surface, so that after the substrate 1 is placed in the reflow oven, the solder flux layer 6 adhering to the surface of the substrate 1 has a uniform thickness. Specifically, the substrate 1 may be a silicon wafer, a glass sheet, or the like. The substrate 1 has high temperature resistance, avoids damage in the reflow oven, and requires low costs. In addition, the substrate 1 further has a function of reflecting light, to facilitate detection of the reflectivity of the solder flux layer 6. A quantity of specific detection points is not limited. There may be one point or a plurality of points, and thickness detection values of the plurality of detection points are averaged.

As shown in FIG. 4, the detection device further includes a judging unit 4 and an alarm unit 5, where the judging unit 4 is configured to determine whether the concentration of the solder flux calculated by the calculation unit 3 is greater than a preset threshold. If the concentration of the solder flux in the reflow oven is greater than the preset threshold, it indicates that the concentration of the solder flux in the reflow oven is excessively high; and after the PABC passes through the reflow oven, the solder flux layer 6 adhering to the surface of the PABC may affect the sensitive device on the PABC, the electrical conductivity of the PABC, and the like. Therefore, through the setting of the preset threshold, if the judging unit 4 determines that the concentration of the solder flux is greater than the preset threshold, the alarm unit 5 sends an alarm signal to remind the operator that the reflow oven needs to be cleaned. It is not difficult to understand that if the judging unit 4 determines that the concentration of the solder flux is not greater than the preset threshold, it indicates that the concentration of the solder flux in the reflow oven is relatively low; and after the PABC passes through the reflow oven, the solder flux does not affect the sensitive device on the PABC, the electrical conductivity of the PABC, and the like, so that welding quality of the PCBA can be ensured, there is no need to clean the reflow oven, and therefore the alarm unit 5 also does not need to send an alarm signal. Specifically, the alarm signal sent by the alarm unit 5 may be an acoustic signal, an optical signal or a text signal, for example, a text reminder is displayed on a display unit or alarm information is sent to a terminal.

In this embodiment, a specific value of the preset threshold is not limited and may be specifically set based on an actual situation, provided that it is ensured that when the concentration of the solder flux in the reflow oven is not greater than the preset threshold, after the PABC passes through the reflow oven, the solder flux does not affect the sensitive device on the PABC, the electrical conductivity of the PABC, and the like.

In addition, the judging unit 4 and the calculation unit 3 may be integrated into one unit, or may be two mutually independent units. This is not specifically limited herein.

The detection device further includes the display unit, where the display unit can display all parameters used during detection of the concentration of the solder flux in the reflow oven, including but not limited to the time t for which the substrate 1 is placed in the reflow oven, the reflectivity R, specific values of the coefficients A, B, and K, the refractive index n of the solder flux layer 6, the thickness d of the solder flux layer 6, the concentration ρ of the solder flux in the reflow oven, the preset threshold, parameters of the incident light 7, and parameters of the reflected light. That is, during the detection of the concentration of the solder flux in the reflow oven, the display unit can display all set parameters, a detection result, and a calculation result, so that it is convenient for the operator to observe a detection status in real time.

Certainly, in this embodiment, the judging unit 4 and the alarm unit 5 may not be provided, and the operator may determine whether the reflow oven needs to be cleaned by observing the display unit. When the judging unit 4 compares the detection result with the preset threshold value and the alarm unit 5 sends an alarm signal, a degree of automation is high. The alarm signal may be any one or a combination of more of a text signal, an acoustic signal, and a photoelectric signal. This is not specifically limited. The alarm signal can remind the operator, thereby reducing a manual operation intensity, preventing a situation that the concentration of the solder flux in the reflow oven is excessively high due to manual misoperation and the solder flux is not cleaned up in a timely manner, and ensuring reliability of a product passing through the reflow oven.

The detection subunit may be arranged in the reflow oven or outside the reflow oven. For example, when the detection subunit is arranged in the reflow oven, the substrate 1 does not need to be taken out during detection, making an operation convenient. The detection subunit needs to have high temperature resistance. Such arrangement is suitable for monitoring the concentration of the solder flux in the reflow oven in real time, periodically or through observation as required. When the detection subunit is outside the reflow oven, during detection, the substrate 1 needs to be taken out of the reflow oven and the reflectivity of the substrate 1 is detected outside the reflow oven. Such arrangement is suitable for periodic detection or detection performed through observation as required. This may be arranged based on an actual situation and has better flexibility.

In addition, the reflow oven may be detected in real time or periodically or through observation as required. If the detection is performed in real time, the substrate 1 is always located in the reflow oven, and the detection subunit is also located in the reflow oven. If the detection is performed periodically or as required, the substrate 1 may be located in the reflow oven or outside the reflow oven, and the position of the detection subunit is not limited.

Regardless of whether the detection subunit is located in the reflow oven or outside the reflow oven, the calculation unit 3, the judging unit 4, the alarm unit 5, and the display unit may all be located outside the reflow oven, and data transmission may be implemented between the units by using a connecting line 9. Specifically, how to implement data transmission between the units by using the connecting line 9 is already a well-known existing technology to a person skilled in the aft. For brevity, details are not described herein again.

Specific examples are used herein to describe the principle and implementations of the present invention. The descriptions of the foregoing embodiments is only intended to help understand the method according to the present invention and the core idea thereof. It should be noted that for a person of ordinary skill in the aft, several improvements and modifications can be further made to the present invention without departing from the principle of the present invention, and these improvements and modifications shall also fall within the protection scope of the claims of the present invention.

What is claimed is:

1. A detection method, comprising:
   placing a substrate in a reflow oven, wherein a solder flux volatilized in the reflow oven is capable of adhering to a surface of the substrate to form a solder flux layer;
   detecting a thickness of the solder flux layer; and
   calculating a concentration of the solder flux in the reflow oven based on the thickness of the solder flux layer.

2. The detection method according to claim 1, wherein calculating the concentration of the solder flux in the reflow oven based on the thickness of the solder flux layer comprises:
   calculating the concentration of the solder flux in the reflow oven using the following formula based on the thickness of the solder flux layer:

$$\rho = \frac{d}{Kt};$$

wherein p is the concentration of the solder flux in the reflow oven, d is the thickness of the solder flux layer, K is a coefficient, and t is a time for which the substrate is placed in the reflow oven.

3. The method according to claim 2, wherein detecting the thickness of the solder flux layer comprises:
   emitting incident light to the substrate by an incident light source;
   receiving, by a receiver, first reflected light reflected by a surface of the solder flux layer and second reflected light reflected by a bottom surface of the solder flux layer;
   calculating reflectivity of the solder flux layer based on the incident light, the first reflected light, and the second reflected light; and
   calculating the thickness of the solder flux layer based on the reflectivity.

4. The method according to claim 3, wherein the thickness of the solder flux layer is calculated by using the following formula 2 based on the reflectivity:

$$d = \frac{\frac{\lambda}{2\pi n} \cdot \arccos(R - A)}{B};$$

wherein R is the reflectivity of the solder flux layer, A and B are both coefficients, n is a refractive index of the solder flux layer, and λ is a wavelength of the incident light.

5. The method according to claim 4, wherein before placing the substrate in the reflow oven, the method further comprises:
   determining the refractive index n of the solder flux layer.

6. The method according to claim 1, wherein after calculating the concentration of the solder flux in the reflow oven, the method further comprises:
   determining whether the concentration of the solder flux is greater than a preset threshold; and
   when the concentration of the solder flux is greater than the preset threshold, sending an alarm signal.

7. The method according to claim 6, further comprising:
   when determining that the concentration of the solder flux is not greater than the preset threshold, re-detecting a thickness of the solder flux layer.

8. The method according to claim 1, further comprising:
   after placing a substrate in a reflow oven and before detecting the thickness of the solder flux layer, taking the substrate out of the reflow oven.

9. A detection device, comprising:
   a substrate, comprising a solder flux layer; and
   a circuit, configured to:
   detect a thickness of the solder flux layer; and
   calculate a concentration of a solder flux in a reflow oven based on the thickness of the solder flux layer.

10. The detection device according to claim 9, wherein the circuit is configured to calculate the concentration of the solder flux in the reflow oven by using the following formula based on the thickness of the solder flux layer:

$$\rho = \frac{d}{Kt};$$

wherein ρ is the concentration of the solder flux in the reflow oven, d is the thickness of the solder flux layer, K is a coefficient, and t is a time for which the substrate is placed in the reflow oven.

11. The detection device according to claim 9, wherein the circuit comprises:
   an incident light source and a receiver, wherein the incident light source is configured to emit incident light to the substrate;
   the receiver is configured to receive first reflected light reflected by a surface of the solder flux layer and second reflected light reflected by a bottom surface of the solder flux layer; and
   the circuit is configured to:
   calculate reflectivity of the solder flux layer based on the incident light, the first reflected light, and the second reflected light; and
   calculate the thickness of the solder flux layer based on the reflectivity.

12. The detection device according to claim 11, wherein the circuit is configured to:
   calculate the thickness of the solder flux layer by using the following formula based on the reflectivity:

$$d = \frac{\frac{\lambda}{2\pi n} \cdot \arccos(R - A)}{B};$$

wherein R is the reflectivity of the solder flux layer, A and B are both coefficients, n is a refractive index of the solder flux layer, and λ is a wavelength of the incident light.

13. The detection device according to claim 12, wherein the circuit is further configured to:
   determine the refractive index n of the solder flux layer.

14. The detection device according to claim 9, further comprising:
   a display, configured to display the thickness of the solder flux layer and the concentration of the solder flux in the reflow oven.

15. The detection device according to claim 9, wherein the circuit is further configured to:
   determine whether the concentration of the solder flux is greater than a preset threshold; and
   sends an alarm signal when it is determined that the concentration is greater than the preset threshold.

16. The detection device according to claim 9, wherein the substrate is a silicon wafer or glass sheet with a smooth surface.

* * * * *

UNITED STATES PATENT AND TRADEMARK OFFICE
CERTIFICATE OF CORRECTION

PATENT NO. : 12,360,040 B2
APPLICATION NO. : 18/037125
DATED : July 15, 2025
INVENTOR(S) : Lv et al.

Page 1 of 1

It is certified that error appears in the above-identified patent and that said Letters Patent is hereby corrected as shown below:

In the Claims

In Column 14, in Claim 2, Line 66, after "wherein" delete "p" and insert -- ρ --.

Signed and Sealed this
Twenty-sixth Day of August, 2025

Coke Morgan Stewart
*Acting Director of the United States Patent and Trademark Office*